US009659481B2

(12) United States Patent
Himmelmann et al.

(10) Patent No.: US 9,659,481 B2
(45) Date of Patent: May 23, 2017

(54) DATA COLLECTION AND MONITORING SYSTEM AND METHOD

(75) Inventors: Gunilla Himmelmann, Mölnlycke (SE); Joshua Carney, Göteborg (SE)

(73) Assignee: SCA HYGIENE PRODUCTS AB, Göteborg (SE)

( * ) Notice: Subject to any disclaimer, the term of this patent is extended or adjusted under 35 U.S.C. 154(b) by 0 days.

(21) Appl. No.: 14/424,620

(22) PCT Filed: Aug. 31, 2012

(86) PCT No.: PCT/SE2012/050928
§ 371 (c)(1),
(2), (4) Date: Feb. 27, 2015

(87) PCT Pub. No.: WO2014/035307
PCT Pub. Date: Mar. 6, 2014

(65) Prior Publication Data
US 2015/0228181 A1    Aug. 13, 2015

(51) Int. Cl.
*G08B 13/00* (2006.01)
*G08B 21/24* (2006.01)
*G06Q 10/06* (2012.01)

(52) U.S. Cl.
CPC ... *G08B 21/245* (2013.01); *G06Q 10/063118* (2013.01)

(58) Field of Classification Search
CPC .. G08B 21/245; G06F 19/327; G06F 19/3418
(Continued)

(56) References Cited

U.S. PATENT DOCUMENTS 6,727,818 B1 * 4/2004 Wildman ............ G06F 19/3418
340/10.1
7,375,640 B1 * 5/2008 Plost .................... A47K 5/1217
340/500
(Continued)

FOREIGN PATENT DOCUMENTS

CN        101080189 A     11/2007
EP        1 667 059 A1     6/2006
(Continued)

OTHER PUBLICATIONS

Extended European Search dated Apr. 1, 2016 issued in corresponding European patent application No. 12883903.2 (7 pages).
(Continued)

*Primary Examiner* — Hoi Lau
(74) *Attorney, Agent, or Firm* — Drinker Biddle & Reath LLP

(57) ABSTRACT

A data collection and monitoring system for at least one defined space within a public or commercial facility includes: a plurality of sensors each monitoring a predetermined parameter; and a data collecting unit arranged for communicating with said sensors within a range of communication which corresponds to the extent of said defined space, with at least one mobile device for a user and with a central server which is associated with a storage medium. The storage medium is adapted for storing and monitoring data related to said sensors. Said data collecting unit is arranged for forwarding data relating to the sensors to the mobile device when the mobile device enters said space.

14 Claims, 2 Drawing Sheets

(58) Field of Classification Search
USPC ... 340/870.16, 10.1, 537.1, 500, 529, 572.1, 340/539.13, 603, 539.16, 286.01, 539.1, 340/3.1
See application file for complete search history.

(56) References Cited

U.S. PATENT DOCUMENTS

| | | | | |
|---|---|---|---|---|
| 7,502,619 | B1* | 3/2009 | Katz | G01S 5/02 340/531 |
| 2002/0086663 | A1 | 7/2002 | Tang et al. | |
| 2004/0221046 | A1* | 11/2004 | Heinonen | H04W 88/08 709/227 |
| 2005/0156712 | A1* | 7/2005 | Jyrinki | H04W 76/02 340/286.01 |
| 2006/0089160 | A1* | 4/2006 | Othmer | H04M 1/72572 455/457 |
| 2007/0090996 | A1* | 4/2007 | Wang | H04L 67/12 342/463 |
| 2008/0001763 | A1* | 1/2008 | Raja | A61L 2/18 340/573.1 |
| 2008/0087719 | A1* | 4/2008 | Sahud | G08B 21/245 235/376 |
| 2008/0228045 | A1* | 9/2008 | Gao | A61B 5/0024 600/301 |
| 2008/0246599 | A1* | 10/2008 | Hufton | G01S 1/70 340/529 |
| 2009/0119142 | A1 | 5/2009 | Yenni et al. | |
| 2010/0117823 | A1* | 5/2010 | Wholtjen | G06F 19/327 340/539.13 |
| 2010/0117836 | A1* | 5/2010 | Seyed Momen | G01S 1/70 340/573.1 |
| 2010/0164728 | A1* | 7/2010 | Plost | G08B 21/245 340/573.1 |
| 2011/0057799 | A1* | 3/2011 | Taneff | G06F 19/327 340/573.1 |
| 2011/0066374 | A1 | 3/2011 | Hartman et al. | |
| 2011/0121974 | A1* | 5/2011 | Tenarvitz | G08B 21/245 340/573.1 |
| 2011/0143779 | A1 | 6/2011 | Rowe et al. | |
| 2011/0163870 | A1 | 7/2011 | Snodgrass | |
| 2011/0193703 | A1* | 8/2011 | Payton | G08B 21/245 340/573.1 |
| 2012/0062382 | A1* | 3/2012 | Taneff | G08B 21/245 340/573.1 |
| 2012/0154169 | A1 | 6/2012 | Hoekstra | |
| 2012/0194338 | A1* | 8/2012 | Snodgrass | G08B 21/245 340/539.12 |
| 2013/0027199 | A1* | 1/2013 | Bonner | G08B 21/24 340/539.11 |
| 2013/0229276 | A1* | 9/2013 | Hunter | G08B 21/245 340/501 |
| 2014/0335901 | A1* | 11/2014 | Lacasse | H04W 4/021 455/456.3 |
| 2015/0371522 | A1* | 12/2015 | Mravyan | H04W 4/006 340/573.1 |
| 2016/0086191 | A1* | 3/2016 | Fonzi | G06Q 30/016 705/304 |

FOREIGN PATENT DOCUMENTS

| | | |
|---|---|---|
| WO | WO 2006/065515 A2 | 6/2006 |
| WO | WO-2012/034590 A1 | 3/2012 |

OTHER PUBLICATIONS

Office communication dated Dec. 21, 2016 issued in corresponding European patent application No. 12883903.2 (8 pages).

Mobile Phone Advertising Mode, Baidu Library May, 12 2011 qian382236771 (2 pages) and its English-language translation thereof (3 pages).

Multimedia Information Push System Based on Wireless wi-fi, Journal of Jilin University (Information Science Edition), vol. 30, No. 1, Jan. 2012, Xiang Liang-liang, et al. (5 pages) and its English-language translation thereof (4 pages).

Examination Report No. 4 issued in corresponding Australian patent application No. 2012388838 dated Mar. 28, 2017 (4 pages).

Examination Report No. 3 issued in corresponding Australian patent application No. 2012388838 dated Jan. 19, 2017 (4 pages).

\* cited by examiner

DATA COLLECTION AND MONITORING SYSTEM AND METHOD

CROSS-REFERENCE TO PRIOR APPLICATION

This application is a §371 National Stage Application of PCT International Application No. PCT/SE2012/050928 filed Aug. 31, 2012, which is incorporated herein in its entirety.

TECHNICAL FIELD

The present disclosure relates to a data collection and monitoring system for at least one defined space within a public or commercial facility, including a plurality of sensors each monitoring a predetermined parameter; and a data collecting unit arranged for communicating with said sensors within a range of communication which corresponds to the extent of said defined space, with at least one mobile device for a user and with a central server which is associated with a storage medium, said storage medium being adapted for storing and monitoring data related to said sensors.

The present disclosure also relates to a method for collecting data and monitoring at least one defined space within a public or commercial facility, including monitoring a predetermined parameter by means of a plurality of sensors; providing communication between a data collecting unit and said sensors, within a range of communication which corresponds to the extent of said defined space, providing communication between said data collecting unit and at least one mobile device for a user; and providing communication between said data collecting unit and a central server which is associated with a storage medium, said storage medium being adapted for storing and monitoring data related to said sensors.

BACKGROUND

Today, the need for proper hygiene, in particular in the form of hand hygiene, is widely acknowledged. For this reason, public or commercial facilities such as washrooms in public buildings, offices, restaurants, airports, hospitals, shopping malls and so on are normally provided with dispensers for various consumable goods, for example paper towels, liquid soap and toilet paper. The purpose is of course to make such consumables easily available to the guests in the washrooms.

Consumables are normally stored in said dispensers, which for this purpose are fixedly located at suitable positions in the washroom. A dispenser can for example be in the form of a holder for paper towels, a holder for toilet paper or a container for liquid soap. Other types of dispensers, for example trash cans, are also used.

The task of checking the level of each consumable, and refilling a dispenser when necessary, i.e. when the level of the consumable is low, is normally assigned to a cleaning staff or a janitor. One problem for a janitor is to know which dispensers that need to be refilled and how much consumable material to bring when servicing an area containing a number of dispensers. Furthermore, from a management point of view, it can be difficult to know in advance how much consumable materials should be ordered and kept in stock. For these reasons, there is a need for dispensers which are arranged for monitoring the actual use of the consumable and for signalling in some suitable manner to a central service office or to a cleaning staff or janitor that, for example, a particular dispenser needs refilling. To this end, it is known that a modern dispenser may include one or more sensors which are arranged for detecting the level of the consumable within the dispenser. Generally, such sensors can be arranged for recognizing any condition indicating that the level of a consumable is low, i.e. by detecting that the level of the consumable is below a predetermined threshold value. The sensor in question can for example be based on an infrared sensor which is arranged for detecting when the height of a paper stack, such as a stack of paper towels in a dispenser, falls below a specified low paper threshold. This threshold corresponds to a condition in which the dispenser needs refilling.

There exist also solutions in which a dispenser is arranged for automatically dispensing a consumable. An example is an automatic soap dispenser which is arranged for automatically discharging a small amount of soap when a user holds a hand under an output nozzle of the dispenser. Such a dispenser can be arranged with sensor arrangements which keep track of the number of occasions that the nozzle has been actuated. The number of occasions can then be used for estimating the amount of consumable which has been fed from the dispenser, and consequently also the remaining amount. When a predetermined minimum threshold has been reached, the dispenser can send a signal to a central service office indicating that it needs refilling.

Other types of sensors can for example be based on a light emitting diode and a photodetector which together can be used for detecting the level of a consumable within a dispenser. A further example is a counter device counting the number of turns on a toilet paper dispenser, wherein the accumulated number of turns corresponds to a certain consumption of toilet paper. Yet another example of a sensor is a traffic counter sensor, i.e. a sensor for counting the number of patrons or users visiting the washroom. The number of visitors in a washroom during a given time period can then be used as an estimate of the level of consumables in dispensers.

As mentioned above, a sensor which is associated with a dispenser for a consumable can be connected to a central service office, i.e. to a central computer server, so that the server is notified when a particular dispenser needs refilling. A notification relating to a dispenser low condition can then be forwarded to members of a cleaning staff, who then has the responsibility of refilling that particular dispenser as soon as possible.

A system for monitoring hygiene applicances is previously known from the patent document US 2011/0163870, which teaches a wireless system for monitoring a number of dispensers. The system comprises a number of sensors which are connected to a hub, i.e. a data collecting unit. The hub is connected to a gateway which communicates, via a cellular network, with a remote server which is associated with a database.

A particular problem which is relevant with regard to a monitoring system of the above-mentioned type is that the system may involve a relatively large number of sensors and data collecting units. There will be a large amount of information to be forwarded to the central server, and there may be difficulties for management and cleaning staff to keep track of requirements for refilling dispensers in different areas or washrooms. There is also a need for the cleaning staff to have access to updated, easily available and clear information with directions defining their work rounds, i.e. which washrooms to visits and which dispensers to refill. The fact that cleaning staff and janitors are constantly moving around in various premises during their working day contributes to the difficulties in forwarding relevant information to them.

From a management point of view, there are difficulties in gaining information regarding how much consumables have been used during a given time period, which washrooms have been cleaned and which are left to clean etc. On a "top management" level, there are requirements for obtaining information as regards work planning and recruitment, i.e. for gaining knowledge for example on how much time it takes for a cleaning staff to clean a certain number of washrooms, including the time it takes for refilling and servicing dispensers of different types.

SUMMARY

Consequently, it is desired to provide a data collection and monitoring system for a defined space within a public or commercial facility which may be arranged for providing relevant, quick and updated information regarding the status of said space, in particular with regard to a number of sensors being located within the space. Such information is then used by different categories of staff, for example cleaning staff and managers, in order to create a cost-effective and easily manageable work situation.

Disclosed is a data collection and monitoring system for at least one defined space within a public or commercial facility, including: a plurality of sensors each monitoring a predetermined parameter; and a data collecting unit arranged for communicating with said sensors within a range of communication which corresponds to the extent of said defined space, with at least one mobile device for a user and with a central server which is associated with a storage medium, said storage medium being adapted for storing and monitoring data related to said sensors. The system is further arranged so that said data collecting unit is arranged for forwarding data relating to the sensors to the mobile device when the mobile device enters said space.

An advantage of the system is that it leads to an efficient and reliable, sustainable and cost-effective solution which minimizes the workload for transmitting data and distributing information in a data collection and monitoring system for a space such as a washroom, having one or more dispensers. More precisely, a user such as a janitor may be served with relevant and updated information so as to carry out the work in an effective manner.

The data collection and monitoring system defines a space wherein the presence of the mobile device within said range is determined. According to an embodiment, the data collecting unit includes a detection unit which is arranged for detecting the presence of said mobile device within said range. The detection unit can detect the presence of the mobile device within said range and can also be used such that the mobile device can detect the presence of the data collecting unit. The mobile device can be arranged for detecting whether it is located within the range. This is carried out by determining whether a data connection between the mobile device and the data collecting unit can be established. According to a further option, the server can be arranged for detecting whether the mobile device is located within the range. This is done by determining the geographical position of the mobile device and determining whether said position is located within said range.

According to an embodiment, the data collecting unit is arranged for registering the point in time at which said mobile device enters said space and the point in time at which the mobile device exits said space. This may be used to keep track of the amount of time spent by a janitor in a given space, and may assist a manager in planning the work force.

Furthermore, the data collecting unit can be arranged for initiating deletion of data, relating to the sensors, from said mobile device when it exits said space. This is an advantage since it frees up memory space in the mobile device.

An embodiment of the system can be arranged so that said plurality of sensors includes at least one of the following sensors: a sensor for measuring the level of a consumable in a dispenser which is arranged in said space; a sensor for indicating whether a dispenser needs refilling; and a sensor for measuring the number of visitors entering a given area such as a washroom.

Also disclosed is a method for collecting data and monitoring at least one defined space within a public or commercial facility, including monitoring a predetermined parameter by means of a plurality of sensors; providing communication between a data collecting unit and said sensors, within a range of communication which corresponds to the extent of said defined space; providing communication between said data collecting unit and at least one mobile device for a user; and providing communication between said data collecting unit and a central server which is associated with a storage medium, said storage medium being adapted for storing and monitoring data related to said sensors. The method further includes forwarding data relating to the sensors from the data collecting unit to the mobile device when the mobile device enters said space.

BRIEF DESCRIPTION OF DRAWINGS

Embodiments of the invention will be described below with reference to the enclosed drawings, in which.

DETAILED DESCRIPTION

Figure 1:
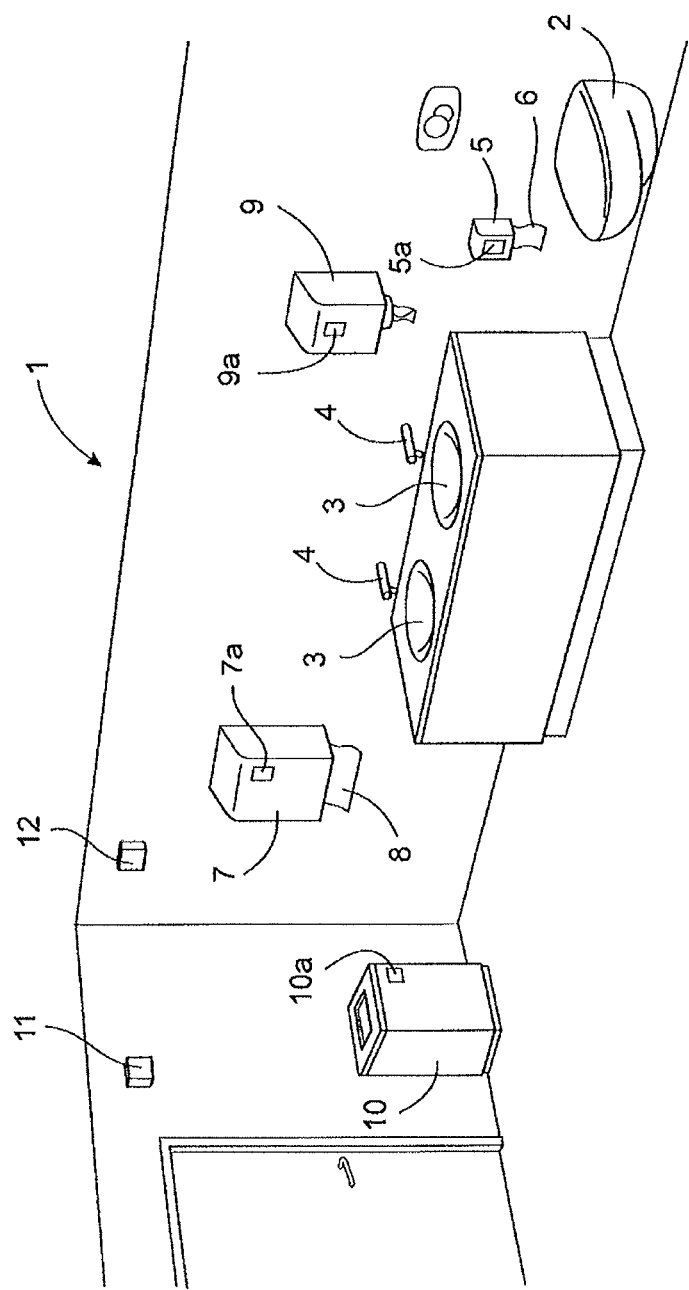
FIG. 1 is a perspective view of a typical public or commercial space in the form of a washroom.

As shown in FIG. 1, the washroom 1 typically may contain a toilet seat 2, a number of sinks 3 and a corresponding number of water taps 4 being associated with the sinks 3.

A first dispenser 5 for toilet paper 6 is arranged in the vicinity of the toilet seat 2 and a second dispenser 7 for paper towels 8 is arranged in the vicinity of the sinks 3. Also, a third dispenser 9 for soap is arranged in the vicinity of the sinks 3. Furthermore, a fourth dispenser 10 for trash is arranged in the washroom 1.

The washroom 1 with its dispensers 5, 7, 9, 10 is provided with a number of sensors. In particular, the first dispenser 5 is provided with a first sensor 5a, which is indicated in a schematical manner in FIG. 1 and which is arranged for detecting the remaining amount of toilet paper 6 in the dispenser 5. Furthermore, the second dispenser 7 is provided with a second sensor 7a which is arranged for detecting the remaining amount of paper towels 8 in the dispenser 7. Furthermore, the third dispenser 9 is provided with a third sensor 9a which is arranged for detecting the remaining amount of soap in the dispenser 9.

The above-mentioned sensors 5a, 7a, 9a are suitably arranged for detecting the level, i.e. the remaining amount of a consumable in each respective dispenser 5, 7, 9. In this context, the term "consumable" should not be interpreted as being limited to soap, paper towels and toilet paper only, but may also include other types of products such as wiping sheets, facial tissues, napkins, surface wipes, web wipes etc., and also other types of liquids such as for example hair shampoo, shower lotion and cleaning detergents.

Also, according to the embodiment, the fourth dispenser 10 in the form of a waste bin can be provided with a fourth sensor 10a which is arranged for detecting the amount of waste in the dispenser 10.

The washroom 1 is suitably also equipped with a fifth sensor 11 in the form of a traffic sensor, i.e. a sensor for detecting the number of persons entering the washroom 1. Such a traffic sensor 11 can suitably be positioned on a wall or in a door entrance, as shown in FIG. 1. The traffic sensor 11 can be based on a light emitting diode which cooperates with a photodetector (not shown in FIG. 1). Alternatively, it can be based on a detector which is arranged to cooperate with a tag or transponder which is carried by a visitor in order to register each visitor entering the washroom, thereby enabling detection of the number of visitors. Other examples of traffic sensors is a trigger sensor triggered by the opening of a door to the washroom 1, a motion sensor triggered by movement of a visitor within the washroom 1 and a light sensor triggered by the lights being turned on in the washroom 1.

In summary, the washroom 1 is provided with a number of sensors 5a, 7a, 9a, 10a, 11, of which at least one sensor (but suitably several) are arranged for monitoring the level of a consumable in connection with said washroom 1.

It should be noted that the term "sensor" should be interpreted as a broad concept, including both sensors actually measuring the level of a consumable (for example, the level of liquid soap) in a dispenser and also sensors which measure parameters which in turn can be regarded as a measurement of the consumable level. For example, a sensor could be in the form of a device which measures the use of a consumable, i.e. a sensor detecting the number of paper towels which have been fed out of the corresponding dispenser. Such a measure can be said to correspond to the level of the consumable. This would assume that the dispenser in question is reset in some manner when it is filled. Furthermore, a sensor could also be in the form of a visitor registration sensor, i.e. a device for counting the number of visitors to the washroom. This measure could also be regarded as an equivalent to the level of the consumables which are used within the washroom. Furthermore, the level of trash in the waste bin 10, which can be detected by means of the corresponding fourth sensor 10a, can be regarded as a measure of the level of consumables in the corresponding dispensers 5, 7, 9 due to the fact that it is possible to determine at least a rough estimate of the level of consumables based on the amount of trash that has been generated and thrown into the waste bin 10.

The sensors 5a, 7a, 9a used for detecting the actual level of a consumable can be of ultrasonic type, i.e. a sensor which allows a distance from a fixed point within a dispenser and up to a stack of sheet product to be determined. From this determination, a measure of the level of the stack can be obtained. Alternatively, the sensors 5a, 7a, 9a can be based on optical technology, i.e on any suitable type generating light in the ultraviolet, infrared or visible range, such as a lamp, laser or light emitting diode (LED), which cooperates with a photo detector.

Other types of sensors can for example be based on a light emitting diode and a photodetector which together can be used for detecting the level of a consumable within a dispenser. A further example is a counter device counting the number of dispensing actions or other actions applicable in order to detect the level of a consumable within a dispenser. An example is where the counter counts the number of turns on a toilet paper dispenser, wherein the accumulated number of turns corresponds to a certain consumption of toilet paper.

The sensors 5a, 7a, 9a, 10a, 11 are connected wirelessly to a data collecting unit 12, which can be positioned on a wall or in the ceiling or on any other suitable surface in the washroom 1. The placement of the sensors is not limited, i.e. the data collecting unit 12 can also be positioned outside the washroom 1, provided that the distance between the data collection unit 12 is sufficiently short so as to maintain a wireless communication between the data collection unit 12 and the sensors 5a, 7a, 9a, 10a, 11. The data collecting unit 12 will be described in detail below with reference to FIG. 2.

Figure 2:
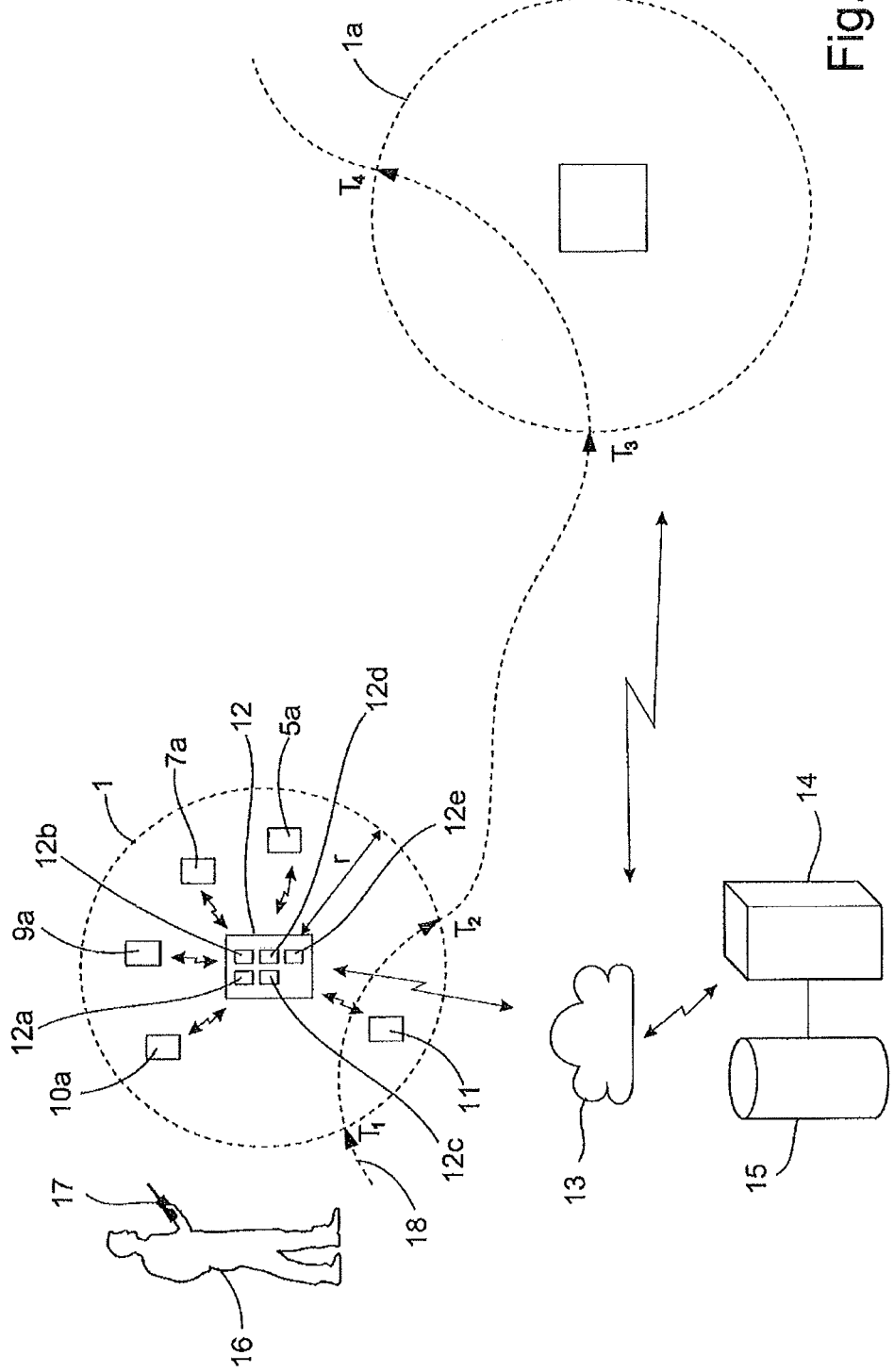
FIG. 2 is a schematical and simplified view of a data collection and monitoring system according to an embodiment of the invention.

With reference to FIG. 2, which is a schematical view of a system according to an embodiment of the invention, a space such as the washroom 1 described above is shown in a simplified manner with a broken line.

It should be noted that the space 1 indicated in FIG. 2 can be in the form of a confined area such as a washroom or restroom area for men or women within a public or professional facility. Examples of such public facilities are public buildings, offices, restaurants, airports, train stations and similar environments. Alternatively, it can be a washroom in some other type of commercial facility such as a hotel, a public building, a shopping mall or similar. It can also be a department within a hospital, for example in the form of a dedicated washroom area in a hospital.

As explained above, the washroom 1 shown in FIG. 2 contains a first sensor 5a for detecting the amount of toilet paper, a second dispenser 7a for detecting the amount of paper towels and a third sensor 9a for detecting the amount of soap. Furthermore, the washroom 1 contains a fourth sensor 10 for detecting the level of trash and a fifth sensor 11 in the form of a traffic sensor or visitor registration sensor.

According to the embodiment, all the sensors 5a, 7a, 9a, 10, 11 are arranged to communicate wirelessly with the data collecting unit 12. Certain sensors, i.e. in this case the sensors 5a, 7a, 9a and 10a, are arranged for monitoring the actual level of a consumable in connection with the washroom 1. In contrast, the fifth sensor 11, i.e. the traffic sensor, and the fourth sensor 10a might also work this way in that it does not measure the actual consumable level but can be used for estimating said consumable level based on other measurements.

The area, or extent, of the washroom 1 generally corresponds to a range r of communication which originates from the position of the data collecting unit 12. It is obvious that the circular perimeter marked with reference numeral 1 in FIG. 2 does not exactly correspond to the physical limitations of the washroom 1 shown in FIG. 1, but for practical purposes the space 1 indicated in FIG. 2 generally corresponds to the area in which the washroom is located.

As will be described in greater detail below, the data collecting unit 12 is arranged for short range communication within a limited geographical area or field corresponding to the space 1. For the purposes of embodiments of the invention, it is assumed that the sensors 5a, 7a, 9a, 10, 11 are positioned within this space 1 so that proper communication can be established between the sensors and the data collecting unit 12. In practical terms, it can be expected that the range r of communication of the data collecting unit 12 is in the interval 10-100 meters, although this range depends to a large extent on the environment and whether there are, for example, thick walls and similar objects in the vicinity of the data collecting unit 12 and the sensors.

The data collecting unit 12, which is shown in a simplified manner in FIG. 2, includes at least one processing unit 12a, at least one memory unit 12b, at least one short range communication unit 12c and at least one long range communication unit 12d. The processing unit 12a is arranged to execute instruction sets for operating the data collecting unit 12 so as to collect data from the different sensors 5a, 7a, 9a, 10, 11 and to store said data in the memory unit 12b. Said data can also be relayed to a central server 14 by means of the long range communication unit 12d and via a communication network 13 such as an Internet connection. The data collecting unit 12 receives data from the sensors by means of the short range communication unit 12c and through the use of a communication protocol which is common with the sensors 5a, 7a, 9a, 10, 11.

The processing unit 12a is arranged for relaying the data via the long range communication unit 12d and via the communication network 13 to the central server 14. This means that the processing unit 12a operates as a bridge between the short range communication unit 12c and the long range communication unit 12d. It should be mentioned here that the central server 14 is associated with a storage medium 15, such as a database, for storing the received data.

Furthermore, FIG. 2 shows a user 16, which for example can be a member of a cleaning staff or a janitor and which is equipped with a mobile device 17. The mobile device 17 is suitably in the form of a mobile phone, a tablet computer, a laptop computer or any other suitable mobile communication device which is arranged for communicating at least with the data collecting unit 12. In particular embodiments, the mobile device 17 is arranged for communicating with the central server, suitably via a conventional mobile telephone network, which is not shown in detail in the drawings.

The long range communication unit 12d may operate with any suitable type of communication mode or protocol, e.g. GSM, GPRS, EDGE, UMTS, HSDPA, LTE, WCDMA, CDMA2000, and so on, as understood by the skilled person and the communication network may be an infrastructure network for the above-mentioned communication protocols and/or a packet based communication network such as the Internet or an intranet. Furthermore, the short range communication unit 12c is constituted by a radio transceiver which can be based on any suitable communication mode or protocol, e.g. a wireless MAC protocol. Suitably, the communication from each sensor 5a, 7a, 9a, 10, 11 to the data collecting unit 12 is compatible with the standard IEEE 802.15.4, with a data rate which can be 250 kb/s and with a frequency of 2.4 GHz.

Furthermore, the communication between the user's 16 mobile device 17 and the data collecting unit 12 can be implemented using a standard such as IEEE 802.15.4, which is the basis for a wireless local area network. It is also the basis for the so-called Zigbee protocol. According to other alternative solutions, short range standards such as Bluetooth or WiFi can also be used to establish a data connection between the mobile device 17 and the data collecting unit 12.

This means that when the user 16 carries the mobile device 17 in the vicinity of the data collecting unit 12, a data communication link will be established between the mobile device 17 and the data collection unit 12, on the condition that the mobile device 17 is within the range r, i.e if the mobile device 17 is close enough to the data collecting unit 12.

FIG. 2 shows a path 18 which enters the range r which is defined by the data collecting unit 12 and then exiting the area defined by said range r. The path 18 describes a situation in which the user 16 walks through a particular area (including the area defined by the washroom 1 and the range r of communication) during a working day, i.e. while following this path 18.

During operation of the data collecting unit 12 and the sensors 5a, 7a, 9a, 10, 11, measurement data relating to the sensors 5a, 7a, 9a, 10, 11 is transmitted to the data collecting unit 12. Such transmission can follow a schedule so that the data in question is forwarded at certain points in time, for example every 5 minutes, to the data collecting unit 12. The data collecting unit 12 is arranged for forwarding said data relating to the sensors 5a, 7a, 9a, 10, 11 to the mobile device 17 when the mobile device 17 enters the space 1.

This means that as soon as the user 16 enters the space 1 and a communication link is established between the mobile device 17 and the data collecting unit 12, a data transmission containing sensor data will be initiated so that the mobile device 17 will receive said sensor data. This is an advantage for the user, since he or she will receive updated, easily available and clear information regarding the washroom in a quick and cost-effective manner. In particular, it can be noted that information related to which washrooms to visits and which dispensers to refill can be obtained in an effective manner.

In order to detect that the mobile device 17 is located within the space 1, the data collecting unit 12 includes a detection unit 12e which is arranged for detecting whether a communication channel is established between the mobile device 17 and the short range communication unit 12c. In this manner, any presence of the mobile device 17 within the space 1 can be detected.

There are several ways of detecting whether the user 16 with the mobile device 17 is located within the space 1. A link is established between the mobile device 17 and the data collecting unit 12 within the range r. This link can be either a communication link as described above or any data connection or simply a detection response in either way. Firstly, the mobile device 17 can be arranged for detecting whether it is located within the range r by determining whether a data connection with said data collecting unit 12 can be established. Secondly, the central server 14 can be arranged for detecting whether the mobile device 17 is located within the range r by first determining the geographical position of the mobile device 17 and then determining whether said position is located within said range r. The position of the mobile device 17 can be determined using the well-known GPS navigation system. This second alternative includes a connection between the mobile device 17 and the server 15, so that the server 15 may receive GPS data from the mobile device 17.

Furthermore, the detection unit 12e in the data collecting unit 12 is arranged for registering the point in time $T_1$ (as indicated in FIG. 2) at which the mobile device 17 enters the space 1. Also, the detection unit 12e is arranged registering the point in time $T_2$ at which the mobile device 17 exits the space 1. This is an advantage, especially from a management point of view, since this means that there is a possibility of keeping track of the amount of time spent by a janitor in a given space 1. This may assist a manager in planning the work force for a given task or for a certain building containing a number of washrooms for example.

Furthermore, according to the embodiment, the data collecting unit 12 is arranged so as to delete data related to measurements by the sensors 5a, 7a, 9a, 10, 11 in said mobile device 17, when the mobile device 17 exits said space 1. This is an advantage, since it may free up memory space in the mobile device 17.

The mobile device 17 can also be arranged for communicating directly with the sensors 5*a*, 7*a*, 9*a*, 10, 11 and with the central server 17, for exchange of information. This means that the user 16 will be given a possibility of communicating with the server 15, for example for obtaining information relating to the washroom and the sensors, without having to access the data collecting unit 12.

As mentioned, the data collecting unit 12 can communicate via a frequency band corresponding to 2.4 GHz. This frequency band allows a very long battery lifetime and allows the use of standard components, which reduces the manufacturing cost of the sensors. The communication of the data collecting unit 12 can be made compatible with the IEEE 802.15.4 standard which specifies the physical layer for low-rate wireless personal area networks. The data collecting unit can communicate via other frequency bands too, for example 868 MHz, 915 MHz, 433 MHz, which are known frequency bands which are suitable for communication of the kind mentioned above.

Also, in order to maintain a secure data communication, said wireless communication is maintained via a double antenna arrangement (not shown in the drawings) on said data collecting unit 12. It is known that in indoor environment situations, some spots may have very low signal strength and signal quality. The fact that two antennas are used according to the embodiment, and assuming that the two antennas are positioned a certain distance apart from each other, it is very likely that at least one of the antennas have sufficient signal.

In summary, the data collection unit 12 is arranged for communicating with the sensors 5*a*, 7*a*, 9*a*, 10, 11 and for collecting data relating to the operation of these sensors 5*a*, 7*a*, 9*a*, 10, 11. More precisely, data from the sensors can be transmitted to the data collection unit 12 on a regular basis, for example every 10 minutes, so as to deliver data indicating the level of each consumable in its corresponding dispenser.

The data collecting unit 12 is furthermore arranged for collecting and sending relevant data to the central server 14 so that said data can be stored in the storage medium 15 and be monitored and processed in a suitable manner in the central server 14. More precisely, the data collecting unit 12 is suitably arranged so as to transmit sensor data to the server 14 at certain occasions so that it can be determined whether the level of a particular consumable has reached at predetermined threshold level. In such case, the corresponding dispenser needs to be refilled. An alert signal indicating a low level within a particular dispenser can be sent to the central server 14 but optionally also to the mobile device 17, so that a member of a cleaning staff can be informed of the requirement to refill the dispenser. The alert may be sent via a text message, an email, an automated voice call or an alert on a webpage that the mobile device is connected to. The alert can also be displayed on a graphical user interface of a computer used by a janitor or member of a cleaning staff.

Furthermore, the traffic sensor 11 as mentioned above can be arranged to transmit data (regarding the number of visitors) to the data collection unit 12, which can then determine whether a certain maximum number of visitors has visited the washroom. This could lead to a decision that the dispensers need refilling.

With regard to the hardware of the sensors 5*a*, 7*a*, 9*a*, 10, they can be manufactured in the form of separate units having non-replaceable batteries which are intended to last the entire lifetime of the sensors.

As indicated in FIG. 2, at least one further space 1*a* such as another washroom can be connected to the same central server 14 via an Internet connection. Generally, the server 14 could be connected to any number of spaces. As indicated in FIG. 2, a user may continue the path 18 through the first space 1 and then further to the second space 1*a*. The points in time $T_3$ (when a user enters the second space 1*a*) and $T_4$ (when a user exits the second space 1*a*) could then be registered in the same manner as mentioned above.

The invention is not limited to the embodiments described above but should be limited only by the scope of the appended claims. For example, a data collecting unit to be used in this invention must not necessarily be located inside the washroom, but can be placed outside the washroom. Also, a sensor for a particular dispenser must not necessarily be positioned inside the dispenser.

Furthermore, a space 1 does not have to be a washroom. More precisely, the invention can be used in many types of spaces such as hospitals, hotels and other public and/or professional facilities.

Finally, as an alternative to a communication route which extends from the sensors, to the data collection unit, and then further to the central server, a relay station (not shown in the drawings) can be used. This means that a sensor may communicate with such a relay station, which in turn passes the signals on to the data communication unit. Also, the data communication unit communicates with the central server in order to store the relevant data.

The invention claimed is:

1. A data collection and monitoring system for at least one defined space within a public or commercial facility, comprising:
    a plurality of sensors each monitoring a predetermined parameter;
    at least one mobile device;
    a central server associated with a storage medium, said storage medium being configured to store and monitor data related to said sensors; and
    a data collecting unit configured to receive information from said sensors within a range of communication which corresponds to the extent of said defined space and configured to communicate with said at least one mobile device for a user and with said central server, said data collecting unit comprising:
    at least one processor;
    at least one memory for storing data relating to said sensors;
    at least one short range communication unit for communicating with at least said sensors and said at least one mobile device within said range of communication which corresponds to the extent of said defined space; and
    at least one long range communication unit for communicating with at least said central server,
    wherein said data collection and monitoring system is configured to determine the presence of the mobile device within said defined space, and
    wherein said data collecting unit is configured to forward data relating to said sensors to the at least one mobile device by a link established between the at least one mobile device and at least one of the at least one short range communication unit of the data collecting unit, when the mobile device is present in said defined space.

2. The data collection and monitoring system according to claim 1, wherein said data collecting unit comprises a detector that detects the presence of said mobile device within said range.

3. The data collection and monitoring system according to claim 1, wherein said mobile device is configured to detect whether it is located within said range by determining whether a data connection with said data collecting unit can be established.

4. The data collection and monitoring system according to claim 1, wherein said server is configured to detect whether the mobile device is located within said range by determining a geographical position of the mobile device and determining whether said geographical position is located within said range.

5. The data collection and monitoring system according to claim 1, wherein said data collecting unit is configured to register the point in time at which said mobile device enters said defined space and the point in time at which said mobile device exits said defined space.

6. The data collection and monitoring system according to claim 1, wherein said data collecting unit is configured to initiate deletion of data, relating to the sensors, from said mobile device when it exits said defined space.

7. The data collection and monitoring system according to claim 1, wherein said plurality of sensors comprises at least one of the following sensors:
- a sensor for measuring the level of a consumable in a dispenser which is arranged in said defined space;
- a sensor for indicating whether a dispenser needs refilling; and
- a sensor for measuring the number of visitors entering a given area.

8. The data collection and monitoring system according to claim 1, wherein said mobile device is configured to communicate directly with the sensors and with the central server, for exchange of information.

9. The data collection and monitoring system according to claim 1, wherein said defined space is a hygiene facility, a hospital, a hotel or a similar public or commercial facility.

10. The data collection and monitoring system according to claim 7, wherein at least one of said sensors is associated with a dispenser for said consumable.

11. A method for collecting data and monitoring at least one defined space within a public or commercial facility, comprising:
- monitoring a predetermined parameter by a plurality of sensors;
- providing communication between a data collecting unit and said sensors via at least one short range communication unit within said data collecting unit, within a range of communication which corresponds to the extent of said defined space,
- providing communication between said data collecting unit and at least one mobile device for a user via at least one of the at least one short range communication unit within said data collecting unit;
- providing communication between said data collecting unit and a central server which is associated with a storage medium via at least one long range communication unit within said data collecting unit, said storage medium being adapted for storing and monitoring data related to said sensors,
- forwarding data relating to the sensors from the data collecting unit to the mobile device when the mobile device is present in said defined space,
- detecting the presence of the mobile device within said range, and
- providing direct communication between said mobile device and the sensors and with the central server, for exchange of information.

12. The method according to claim 11, further comprises:
- registering the point in time at which said mobile device enters said defined space; and
- registering the point in time at which said mobile device exits said defined space.

13. The method according to claim 11, further comprises deleting data, in said mobile device and relating to the sensors, when the mobile device exits said defined space.

14. The method according to claim 11, further comprises measuring at least one of the following parameters of said sensors:
- the level of a consumable in a dispenser which is arranged in said defined space;
- an indication of whether a dispenser needs refilling; and
- the number of visitors entering a given area.

* * * * *